United States Patent [19]
Teates

[11] Patent Number: 5,986,275
[45] Date of Patent: Nov. 16, 1999

[54] REUSABLE SHIELDED MARKER FOR NUCLEAR MEDICINE IMAGING

[75] Inventor: Charles D. Teates, Charlottesville, Va.

[73] Assignee: The University of Virginia Patent Foundation, Charlottesville, Va.

[21] Appl. No.: 08/868,751

[22] Filed: Jun. 5, 1997

Related U.S. Application Data

[60] Provisional application No. 60/019,247, Jun. 7, 1996.

[51] Int. Cl.$^6$ ............................... G21F 5/02; G21F 5/00
[52] U.S. Cl. ..................................... 250/498.1; 250/506.1
[58] Field of Search .......................... 250/458.1, 496.1, 250/498.1, 505.1, 506.1

[56] References Cited

U.S. PATENT DOCUMENTS

| | | | |
|---|---|---|---|
| 2,926,262 | 2/1960 | Clark et al. | 250/498.1 |
| 3,177,364 | 4/1965 | Green | 250/498.1 |
| 5,068,883 | 11/1991 | Dehaan et al. | 250/498.1 |
| 5,349,627 | 9/1994 | Virta et al. | 378/166 |

*Primary Examiner*—Bruce C. Anderson
*Attorney, Agent, or Firm*—Oblon, Spivak, McClelland, Maier & Neustadt

[57] ABSTRACT

A reusable shielded marker for nuclear medicine imaging provides a chamber of radiation-shielding material such as lead to receive the radiodnuclide such as technetium pertechnetate. The chamber is mounted on a spring which also bears a shutter provided with an aperture. When force is applied against the bias of the spring, the aperture and the shutter is brought into alignment with the chamber permitting the radionuclide to emit radiation so as to briefly mark the image to be prepared. When the force is released, the spring biases the shutter out of alignment, such that the radiation-shielding material of the shutter blocks the chamber and shields the user and patient from the emission of radiation. The device may be stored, and reused, with radionuclide being replaced in the chamber as necessary.

8 Claims, 4 Drawing Sheets

REUSABLE SHIELDED MARKER FOR NUCLEAR MEDICINE IMAGING

This application is a regular National application claiming priority from Provisional Application, U.S. application Ser. No. 60/019,247 filed Jun. 7, 1996.

FIELD OF THE INVENTION

This invention pertains to markers for nuclear medicine imaging. Specifically, an apparatus which permits the quick, safe, localized marking of structures on images of patients generated by nuclear imaging as provided. The radioactive material is inserted in the device immediately before imaging, and may be retained in the device until exhausted (decayed). The invention pertains to the device, as well as the method of using that device.

DESCRIPTION OF THE INVENTION

Nuclear medicine is a rapidly expanding diagnostic clinical field. Nuclear imaging permits the preparation of images of soft tissues and bone, making selective diagnosis on the basis of the nuclear medical imaging alone, or in conjunction with other conventional techniques, a more certain process.

In the practice of nuclear imaging, it is conventional to use a "marker source" to localize structures on images of patients generated through this technology. Thus, where a particular structure in the image is to be studied, a localized radioactive source is used to "mark" that structure, or identify it for further study. Localized, portable markers are also used to orient the image, that is, mark the right or left side of the patient, height indications, front and back, etc.

Currently available technologies, while focusing on the development of the image itself, have not provided effective, safe marker sources. Commercially available localized markers do not provide shielding to protect the medical technician and the patient from exposure to the radiation source, or radionuclide. Currently available sources have a constant radiation output. The radiation cannot be stopped, or interrupted, while positioning the marker/patient for imaging. Additionally, the sources currently available do not provide a sharply localized, defined image. Marking small structures for study is particularly difficult. Further, currently available source markers come provided with the nuclide or radioactive material. When the nuclide has decayed, the source marker is no longer usable.

Accordingly an object of the art is to provide, an improved source marker which provides shielding for the diagnostician and the patient from the radiation source, provides a radiation source which can be interrupted when the source is positioned for imaging, provides sharply defined, localized marking and is refillable and reusable.

SUMMARY OF THE INVENTION

The invention comprises a radiation shielding chamber provided with a bottom, walls and a top, which top is either open, or, in a preferred embodiment, the chamber is provided with a radiation-shielding top, which top is provided with an aperture. The chamber is affixed to a spring, at the opposite end of which, provided proximal to the chamber, is a shutter. The shutter extends over the top of the chamber, and is provided with an aperture which, when aligned with the open top or aperture provided in the top of the chamber, permits emission of radiation through the shutter. The shutter and the chamber are moved into alignment by applying pressure the spring, to which both are attached. Releasing the spring closes the shutter, shutting off the radiation. The source of radiation, the radionuclide, is customarily provided on a felt or other absorbent in the chamber. The felt or absorbent may be loaded through the top, or through the aperture. When exhausted, the radionuclide is removed, and another source provided when the device is to be next used.

DETAILED DESCRIPTION OF THE INVENTION

The device and method of the invention are described below, by reference to the drawings, in which like numbers represent like elements. While lead is a preferred material for the chamber and shutter, so as to ensure radiation-opacity, other radiation-attenuating materials are known, and may be employed alone, or in conjunction with lead. The spring shown is a simple clip spring design, but coiled springs, leaf springs and the like could also be employed.

Figure 1:
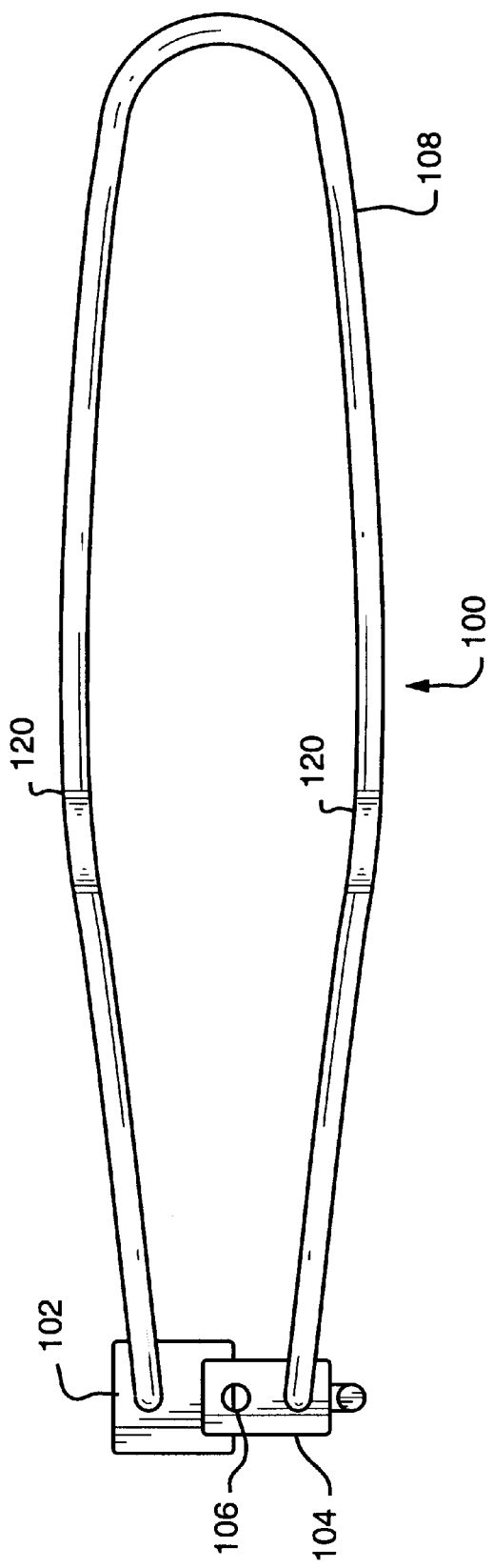
FIG. 1 is an illustration of the shielded marker device of the invention, with the chamber and shutter out of alignment, so that the aperture provided in the top of the chamber is occluded by the shutter.
Figure 2:
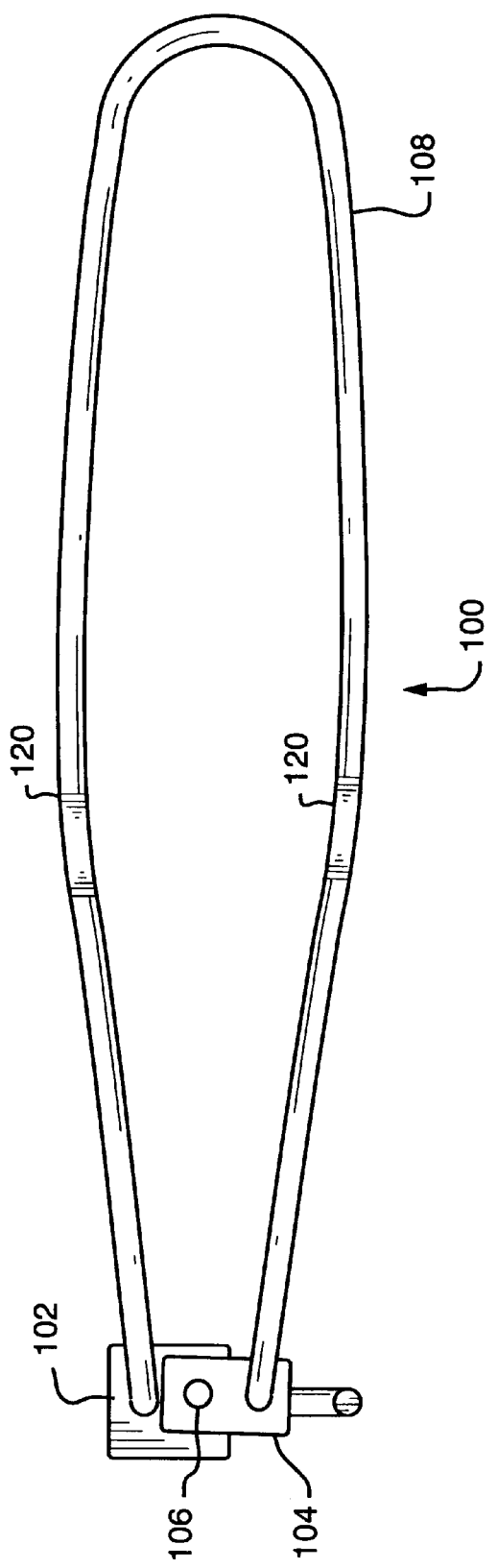
In FIG. 2, the spring has been shown as closed, to place the aperture and the shutter in alignment with the aperture in the top of the chamber, releasing radiation through the aligned apertures.
Figure 3:
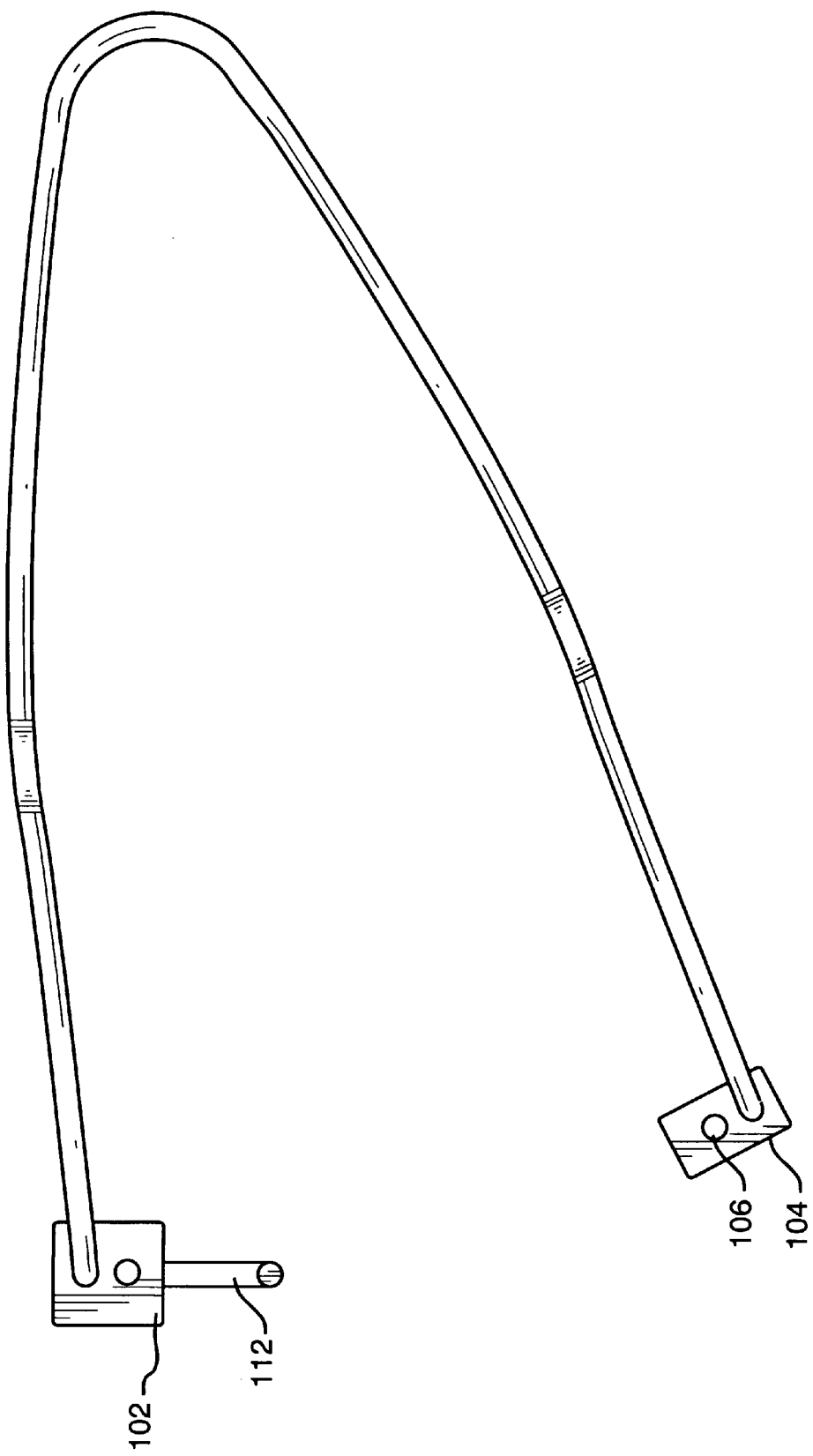
In FIG. 3, the shutter has been shown open, so as to permit removal and insertion of radionuclide liquid absorbing material.
Figure 4:
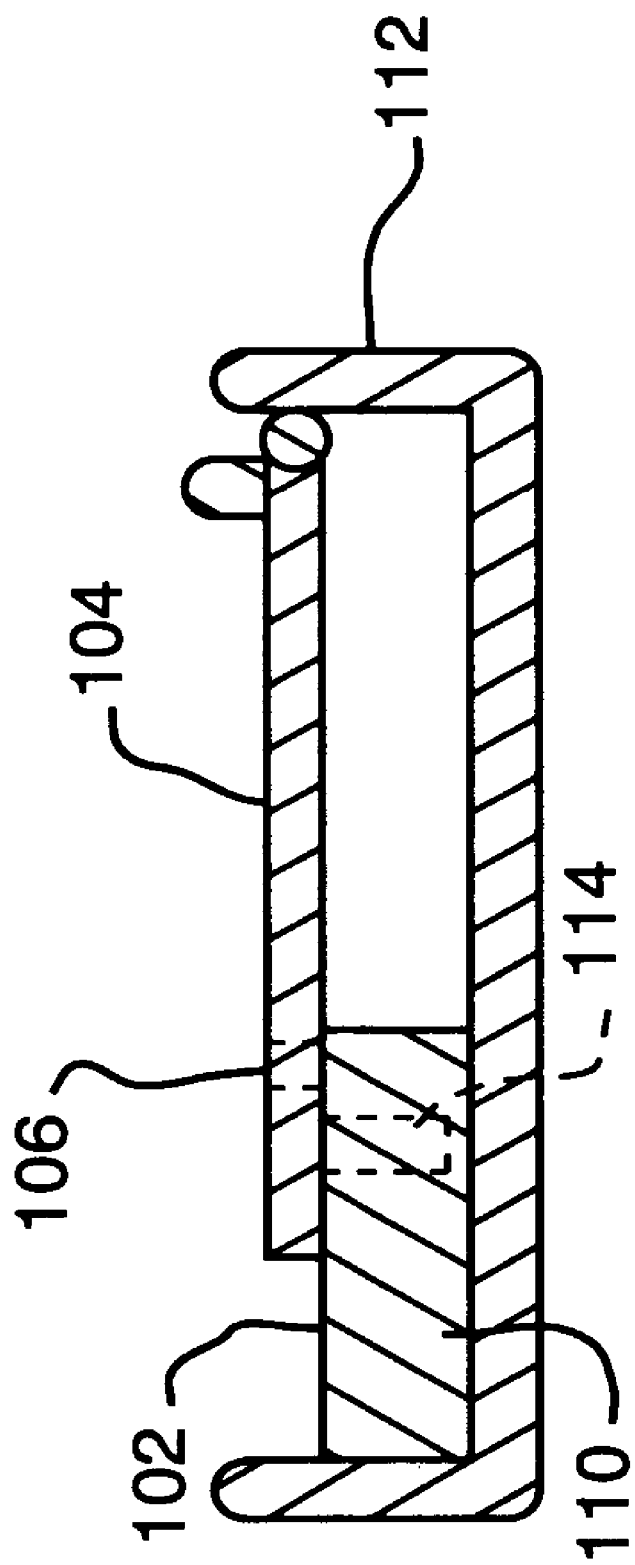
FIG. 4 is an enlarged end view of the device, showing the chamber, the radionuclide in the chamber, when the shutter and chamber are out of alignment.

The reusable, shielded marker source 100 illustrated in the FIG. 1 has a spring loaded source chamber 102. The source chamber is provided with walls 110 illustrated in FIG. 4, and a movable shutter 104, which are comprised of lead or other radiation-shielding material. The shutter may be moved aside by compressing spring 108 for loading the chamber retaining arm 112 with a felt or other absorbant textile, on which is a radionuclide, generally technetium 99m pertechnetate, or other radiopharmaceutical commonly available in diagnostic laboratories. The chamber 102 is loaded by placing a small amount (a droplet or two) of radionuclide solution on felt 114 shown in FIG. 4 contained in the chamber. Once loaded, the lead shutter is closed by releasing the spring. When closed, no radiation is emitted and the diagnostician and the patient are not exposed.

When it is time to mark an image, the shutter is opened by squeezing the spring on which the shutter is loaded. This causes alignment of the aperture 106 of the shutter 104 with chamber 102, emitting radiation from the radionuclide on felt 114, which permits rapid localization on the image. This can usually be achieved in a brief period of 1–3 seconds. After completion of marking, the spring 108 is released and the shutter 104 closes moving out of alignment with chamber aperture 106. It is important to note that shutter closing occurs automatically on release of the spring mechanism. Upon release, the source is no longer marking on the image, and no further exposure occurs to medical personnel or the patient.

After completion of the marking operation, the device is then put into a secured box or location, until next use. If the next use is sufficiently delayed such that the nuclide has decayed, the chamber is easily emptied simply by opening the shutter, a new felt is prepared, and imaging takes place as described. For ease of operation, compression pads 120 are provided for the operator.

The above invention has been described generically, and by specific example, with respect to spring, structures, materials, etc. Alternatives will occur to those of skill in the art, particularly with respect to the type of spring to be employed, radionuclide and other materials to be used, open and rest positions. Such alternatives do not require the exercise of inventive faculty, and remain within the scope of the invention, unless excluded by the recitations of the claims set forth below.

What is claimed is:

1. An apparatus permitting radioactive marking of nuclear images, said apparatus comprising:

a body comprising an elongated spring, said elongated spring having a first end and a second end;

a chamber mounted to said first end of said elongated spring, said chamber having an opening; and a radiation-shielding shutter, said shutter being mounted to said second end of said elongated spring and having an aperture therein, said aperture having a first position out of alignment with said opening in said chamber and a second position in alignment with said opening in said chamber;

said elongated spring normally biasing said aperture of said shutter into said first position out of alignment with said opening in said chamber;

wherein a hand force may be applied against the bias of said elongated spring to move said aperture of said shutter into said second position in alignment with said opening in said chamber and wherein releasing said elongated spring returns said aperture to said first position out of alignment with said opening in said chamber such that said radiation-shielding shutter occludes said opening in said chamber.

2. The apparatus of claim 1, wherein said chamber is provided with a radionuclide retaining means, said retaining means being configured to permit replacement of said radionuclide once said radionuclide has decayed.

3. The apparatus of claim 2, wherein said radionuclide retaining means is an absorbent textile.

4. The apparatus of claim 2, wherein said radionuclide is technetium 99 pertechnetate.

5. The apparatus of claim 1, wherein said sprung is provided with pads to permit the application of a force against said bias by an operators hand.

6. The apparatus of claim 1, wherein said radiation-shielding materials are comprised of lead.

7. A method for marking a location on a nuclear age, comprising applying a bias against the spring of the apparatus of claim 1 such that said shutter aperture is brought into alignment with said chamber which contains a source of radiation, maintaining said shutter aperture in alignment with said chamber for a period of time sufficient to emit radiation sufficient to mark said image, and releasing said force so that said shutter is biased from said chamber so that said chamber is occluded by said shutter and said shutter aperture is not in alignment with said shutter.

8. The method of claim 7, wherein said period of time is approximately 1–3 seconds.

* * * * *